(12) United States Patent
Homma et al.

(10) Patent No.: US 11,977,142 B2
(45) Date of Patent: May 7, 2024

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventors: Takuya Homma, Yokohama (JP); Masamitsu Nishikido, Yokohama (JP); Tooru Sahara, Yokohama (JP); Youhei Murakami, Yokohama (JP); Satoshi Kawaji, Yokohama (JP); Masayuki Sato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 534 days.

(21) Appl. No.: 17/282,355

(22) PCT Filed: Sep. 26, 2019

(86) PCT No.: PCT/JP2019/037917
§ 371 (c)(1),
(2) Date: Apr. 1, 2021

(87) PCT Pub. No.: WO2020/071242
PCT Pub. Date: Apr. 9, 2020

(65) Prior Publication Data
US 2021/0349200 A1    Nov. 11, 2021

(30) Foreign Application Priority Data
Oct. 5, 2018    (JP) ................. 2018-190379

(51) Int. Cl.
*G01S 13/04*    (2006.01)
*G01S 7/35*    (2006.01)
*G01S 13/931*    (2020.01)

(52) U.S. Cl.
CPC ............... *G01S 13/04* (2013.01); *G01S 7/35* (2013.01); *G01S 13/931* (2013.01); *G01S 2013/9315* (2020.01)

(58) Field of Classification Search
CPC .... G01S 13/04; G01S 7/35; G01S 2013/9315; G01S 13/931
See application file for complete search history.

(56) References Cited

U.S. PATENT DOCUMENTS

| | | | |
|---|---|---|---|
| 6,137,434 A * | 10/2000 | Tohya | H01Q 1/38 342/175 |
| 6,583,753 B1 * | 6/2003 | Reed | G01S 13/931 342/72 |
| 6,750,810 B2 * | 6/2004 | Shinoda | H01Q 25/002 342/149 |

(Continued)

FOREIGN PATENT DOCUMENTS

| | | |
|---|---|---|
| EP | 1 522 869 A1 | 4/2005 |
| JP | H11133144 A | 5/1999 |

(Continued)

*Primary Examiner* — Peter M Bythrow
(74) *Attorney, Agent, or Firm* — Studebaker & Brackett PC

(57) ABSTRACT

An electronic device comprises: a transmission antenna configured to transmit transmission waves; a reception antenna configured to receive reflected waves resulting from reflection of the transmission waves; and a controller. The controller is configured to detect an object reflecting the transmission waves, based on a transmission signal transmitted as the transmission waves and a reception signal received as the reflected waves. The controller is configured to make a range of detection of the object by the transmission signal and the reception signal, variable.

10 Claims, 6 Drawing Sheets

(56) References Cited

U.S. PATENT DOCUMENTS

| | | | | |
|---|---|---|---|---|
| 7,081,847 | B2* | 7/2006 | Ziller | H01Q 25/002 342/158 |
| 8,009,082 | B2* | 8/2011 | Shinoda | G01S 13/4463 342/147 |
| 8,077,076 | B2* | 12/2011 | Walter | G01S 13/345 342/128 |
| 8,902,103 | B2* | 12/2014 | Kim | G01S 13/345 342/134 |
| 10,605,911 | B1* | 3/2020 | Parker | G01S 13/42 |
| 10,606,272 | B2* | 3/2020 | Seo | G05D 1/021 |
| 10,627,507 | B1* | 4/2020 | Parker | H01Q 25/00 |
| 11,733,375 | B2* | 8/2023 | Kim | G01S 13/726 342/70 |
| 2003/0112172 | A1* | 6/2003 | Shinoda | G01S 13/4463 342/149 |
| 2005/0128132 | A1 | 6/2005 | Ziller et al. | |
| 2006/0158369 | A1* | 7/2006 | Shinoda | H01Q 3/06 342/146 |
| 2007/0205938 | A1* | 9/2007 | Zimmermann | G01S 13/87 342/69 |
| 2007/0241962 | A1* | 10/2007 | Shinoda | H01Q 1/425 342/361 |
| 2008/0136702 | A1* | 6/2008 | Tsuchihashi | G01S 13/34 342/27 |
| 2008/0272955 | A1* | 11/2008 | Yonak | H01Q 15/0086 342/54 |
| 2009/0267822 | A1* | 10/2009 | Shinoda | G01S 13/4463 342/70 |
| 2012/0194377 | A1* | 8/2012 | Yukumatsu | G01S 13/347 342/368 |
| 2015/0042507 | A1* | 2/2015 | Jeong | G01S 13/345 342/175 |
| 2018/0074181 | A1* | 3/2018 | Kishigami | G01S 13/282 |
| 2018/0149737 | A1 | 5/2018 | Kim et al. | |
| 2018/0321368 | A1* | 11/2018 | Bharadwaj | G01S 13/42 |
| 2019/0377059 | A1* | 12/2019 | Kondo | H01Q 21/24 |

FOREIGN PATENT DOCUMENTS

| | | |
|---|---|---|
| JP | 2017-147487 A | 8/2017 |
| JP | 2017215195 A | 12/2017 |
| WO | 2018155439 A1 | 8/2018 |

* cited by examiner

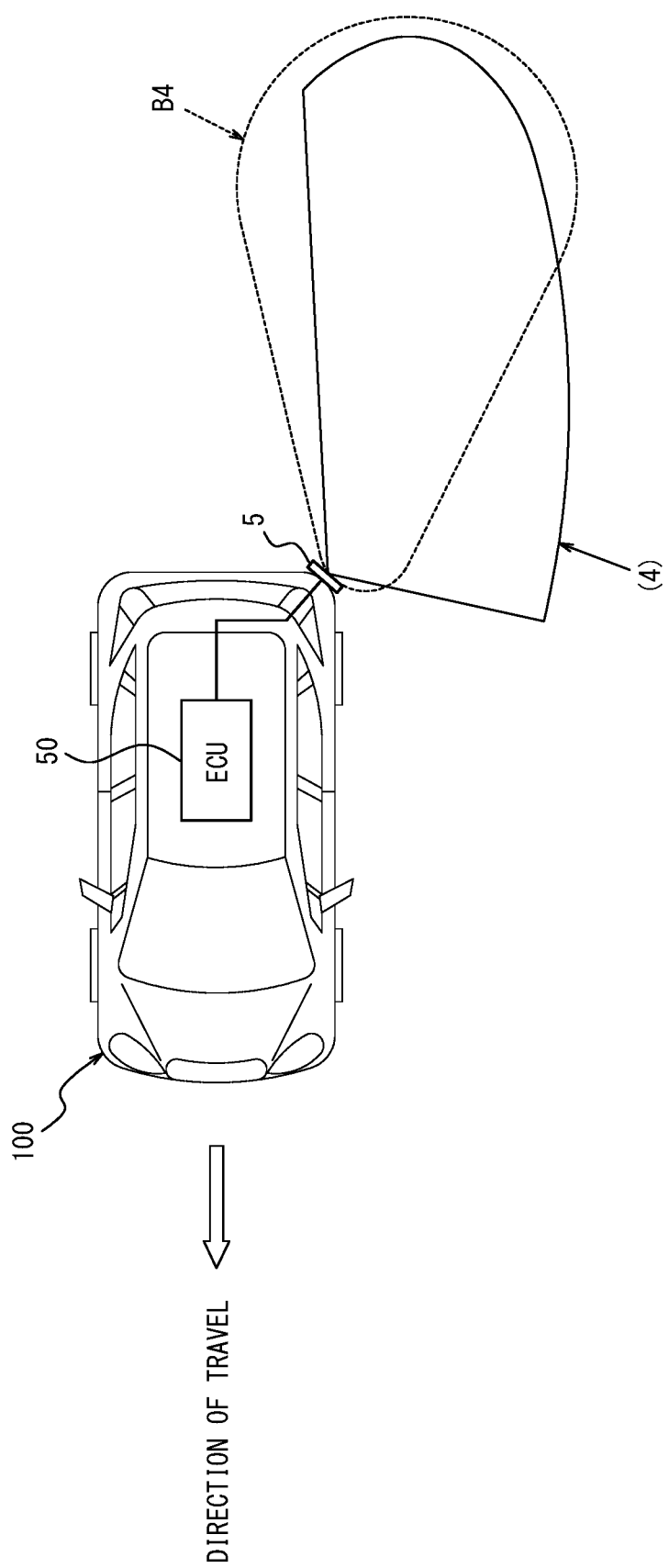

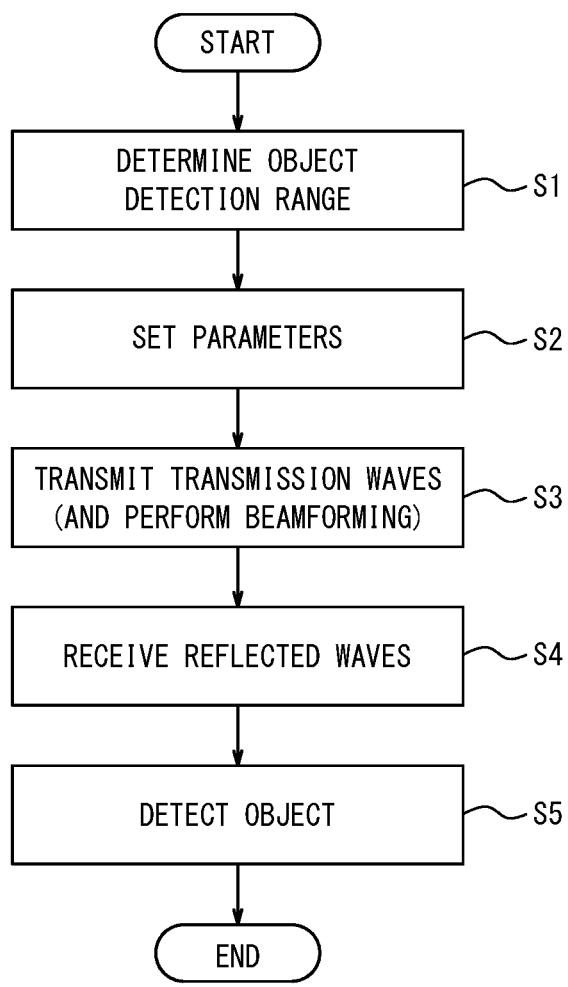

ELECTRONIC DEVICE, CONTROL METHOD OF ELECTRONIC DEVICE, AND CONTROL PROGRAM OF ELECTRONIC DEVICE

CROSS REFERENCE TO RELATED APPLICATION

This application claims priority to and the benefit of Japanese Patent Application No. 2018-190379 filed on Oct. 5, 2018, the entire disclosure of which is incorporated herein by reference.

TECHNICAL FIELD

The present disclosure relates to an electronic device, a control method of an electronic device, and a control program of an electronic device.

BACKGROUND

In fields such as automobile-related industry, techniques of measuring, for example, the distance between a vehicle and a certain object are considered important. In particular, various techniques of radar (radio detecting and ranging) that measures, for example, the distance from an object such as an obstacle by transmitting radio waves such as millimeter waves and receiving reflected waves reflected off the object are studied in recent years. The importance of such techniques of measuring distance and the like is expected to further increase in the future, with the development of techniques of assisting the driver in driving and techniques related to automated driving whereby driving is wholly or partly automated.

There are also various proposals for techniques of detecting the presence of a certain object by receiving reflected waves resulting from reflection of transmitted radio waves off the object. For example, JP H11-133144 A (PTL 1) discloses a FM-CW radar device that irradiates a target object with a transmission signal subjected to linear FM modulation in a specific cycle, detects a beat signal based on the difference from a signal received from the target object, and analyzes the frequency of the signal to measure distance and speed.

CITATION LIST

Patent Literature

PTL 1: JP H11-133144 A

SUMMARY

An electronic device according to an embodiment comprises: a transmission antenna configured to transmit transmission waves; a reception antenna configured to receive reflected waves resulting from reflection of the transmission waves; and a controller. The controller is configured to detect an object reflecting the transmission waves, based on a transmission signal transmitted as the transmission waves and a reception signal received as the reflected waves. The controller is configured to make a range of detection of the object by the transmission signal and the reception signal, variable.

A control method of an electronic device according to an embodiment comprises: (1) transmitting transmission waves from a transmission antenna; (2) receiving reflected waves resulting from reflection of the transmission waves, by a reception antenna; (3) detecting an object reflecting the transmission waves, based on a transmission signal transmitted as the transmission waves and a reception signal received as the reflected waves; and (4) making a range of detection of the object by the transmission signal and the reception signal, variable.

A control program of an electronic device according to an embodiment causes a computer to execute the foregoing (1) to (4).

BRIEF DESCRIPTION OF THE DRAWINGS

In the accompanying drawings:

FIG. 5 is a diagram illustrating another example of operation of the electronic device according to the embodiment; and FIG. 6 is a flowchart illustrating operation of the electronic device according to the embodiment.

DETAILED DESCRIPTION

It is desirable to improve convenience in techniques of detecting a certain object by receiving reflected waves resulting from reflection of transmitted transmission waves off the object. It could therefore be helpful to provide an electronic device, a control method of an electronic device, and a control program of an electronic device that can improve convenience in object detection. According to an embodiment, it is possible to provide an electronic device, a control method of an electronic device, and a control program of an electronic device that can improve convenience in object detection. One of the disclosed embodiments will be described in detail below, with reference to the drawings.

An electronic device according to an embodiment can be mounted in a vehicle (mobile body) such as a car (automobile) to detect a certain object around the mobile body. The electronic device according to the embodiment can transmit transmission waves to the surroundings of the mobile body from a transmission antenna installed in the mobile body. The electronic device according to the embodiment can also receive reflected waves resulting from reflection of the transmission waves, by a reception antenna installed in the mobile body. At least one of the transmission antenna and the reception antenna may be included in, for example, a radar sensor installed in the mobile body.

The following will describe a structure in which the electronic device according to the embodiment is mounted in a car such as a passenger car, as a typical example. The electronic device according to the embodiment is, however, not limited to being mounted in a car. The electronic device according to the embodiment may be mounted in various mobile bodies such as a bus, a truck, a motorcycle, a bicycle, a ship, an airplane, a robot, and a drone. The electronic device according to the embodiment is not limited to being mounted in a mobile body that moves with its own power. For example, the mobile body in which the electronic device according to the embodiment is mounted may be a trailer portion towed by a tractor. The electronic device according to the embodiment can measure, for example, the distance between the sensor and the object in a situation in which at least one of the sensor and the object can move. The electronic device according to the embodiment can also measure, for example, the distance between the sensor and the object when both the sensor and the object are stationary.

An example of object detection by the electronic device according to the embodiment will be described below.

Figure 1:
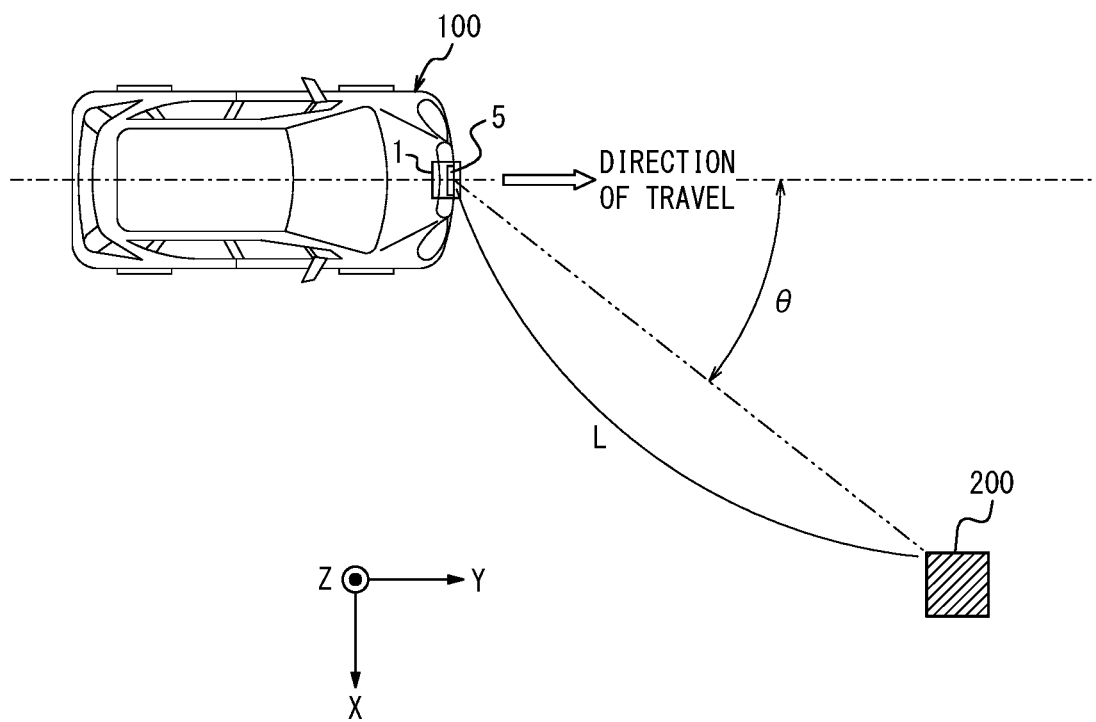
FIG. 1 is a diagram illustrating a use state of an electronic device according to an embodiment.

FIG. 1 is a diagram illustrating a use state of the electronic device according to the embodiment. FIG. 1 illustrates an example in which a sensor including a transmission antenna and a reception antenna according to the embodiment is installed in a mobile body.

A sensor 5 including a transmission antenna and a reception antenna according to the embodiment is installed in a mobile body 100 illustrated in FIG. 1. An electronic device 1 according to the embodiment is mounted (e.g. included) in the mobile body 100 illustrated in FIG. 1. A specific structure of the electronic device 1 will be described later. For example, the sensor 5 may include at least one of the transmission antenna and the reception antenna. The sensor 5 may include at least one of the other functional parts, such as at least part of a controller 10 (FIG. 2) included in the electronic device 1, as appropriate. The mobile body 100 illustrated in FIG. 1 may be a vehicle of a car such as a passenger car. The mobile body 100 illustrated in FIG. 1 may be any type of mobile body. In FIG. 1, for example, the mobile body 100 may move (run or slow down) in the Y-axis positive direction (direction of travel) in the drawing, move in other directions, or be stationary without moving.

The mobile body 100 is a mobile body in which the sensor 5 is mounted. Examples of the mobile body 100 include a car, a bus, a truck, a motorcycle, and a bicycle. Although an example in which the sensor 5 is mounted in the mobile body 100 is described herein, the presently disclosed techniques are not limited to such. For example, the sensor 5 may be mounted in a mobile body other than the mobile body 100, such as a bicycle, a drone, a ship, an airplane, a robot, or a pedestrian. The sensor 5 may be mounted in any object that is not a mobile body, or installed in any location without being mounted in another object. The electronic device according to the embodiment is not limited to being mounted in a mobile body that moves with its own power. For example, the mobile body in which the electronic device according to the embodiment is mounted may be a trailer portion towed by a tractor. In an embodiment, the sensor 5 may be installed inside a bumper of the mobile body 100 so as not to be seen from outside. The installation position of the sensor 5 in the mobile body 100 may be any of outside and inside the mobile body 100. The term "inside the mobile body 100" denotes, for example, inside the body of the mobile body 100, inside the bumper, inside a headlight, inside the interior space, or any combination thereof. The number of sensors 5 mounted in a mobile body or the like is not limited to 1, and may be any number greater than or equal to 1.

As illustrated in FIG. 1, the sensor 5 including a transmission antenna is installed in the mobile body 100. In the example illustrated in FIG. 1, only one sensor 5 including a transmission antenna and a reception antenna is installed at the front of the mobile body 100. The position at which the sensor 5 is installed in the mobile body 100 is not limited to the position illustrated in FIG. 1, and may be any other position as appropriate. For example, the sensor 5 illustrated in FIG. 1 may be installed at the left, the right, and/or the back of the mobile body 100. The number of sensors 5 may be any number greater than or equal to 1, depending on various conditions (or requirements) such as the range and/or accuracy of measurement in the mobile body 100.

The sensor 5 transmits electromagnetic waves from the transmission antenna as transmission waves. For example, in the case where there is a certain object (e.g. an object 200 illustrated in FIG. 1) around the mobile body 100, at least part of the transmission waves transmitted from the sensor 5 is reflected off the object to become reflected waves. As a result of the reflected waves being received by, for example, the reception antenna of the sensor 5, the electronic device 1 mounted in the mobile body 100 can detect the object.

The sensor 5 including the transmission antenna may be typically a radar (radio detecting and ranging) sensor that transmits and receives radio waves. The sensor 5 is, however, not limited to a radar sensor. For example, the sensor 5 according to the embodiment may be a sensor based on a technique of lidar (light detection and ranging, laser imaging detection and ranging) by lightwaves. Such sensors may include, for example, patch antennas and the like. Since the techniques of radar and lidar are already known, detailed description is simplified or omitted as appropriate.

The electronic device 1 mounted in the mobile body 100 illustrated in FIG. 1 is connected to the sensor 5. In this embodiment, the electronic device 1 may be located outside or inside the mobile body 100. The electronic device 1 receives reflected waves of transmission waves transmitted from the transmission antenna in the sensor 5, by the reception antenna. Thus, the electronic device 1 can detect the object 200 present within a predetermined distance from the mobile body 100. For example, the electronic device 1 can measure the distance L between the mobile body 100 as the own vehicle and the object 200, as illustrated in FIG. 1. The electronic device 1 can also measure the relative speed of the mobile body 100 as the own vehicle and the object 200. The electronic device 1 can further measure the direction (arrival angle θ) in which the reflected waves from the object 200 reaches the mobile body 100 as the own vehicle.

The object 200 may be, for example, at least one of an oncoming car running in a lane adjacent to the mobile body 100, a car running parallel to the mobile body 100, and a car running ahead or behind in the same lane as the mobile body 100. The object 200 may be any object around the mobile body 100, such as a motorcycle, a bicycle, a stroller, a pedestrian, a guardrail, a manhole, a median strip, a road sign, a sidewalk step, a wall, and an obstacle. The object 200 may be moving or stopped. For example, the object 200 may be a car parked or stopped around the mobile body 100. In the present disclosure, examples of the object 200 detected by the sensor 5 include not only non-living objects but also living objects such as humans and animals. In the present disclosure, the object 200 detected by the sensor 5 includes a target such as a human, a thing, or an animal detected by radar technology.

In FIG. 1, the ratio among the size of the electronic device 1, the size of the sensor 5, and the size of the mobile body 100 does not necessarily represent the actual ratio. In FIG. 1, the sensor 5 is installed on the outside of the mobile body 100. However, in an embodiment, the sensor 5 may be installed at any of various locations in the mobile body 100. For example, in an embodiment, the sensor 5 may be installed inside the bumper of the mobile body 100 so as not to be seen from outside.

It is assumed here that the transmission antenna in the sensor 5 transmits radio waves in a frequency band such as millimeter waves (30 GHz or more) or submillimeter waves (e.g. about 20 GHz to 30 GHz), as a typical example. For example, the transmission antenna in the sensor 5 may transmit radio waves with a frequency bandwidth of 4 GHz, e.g. 77 GHz to 81 GHz.

Figure 2:
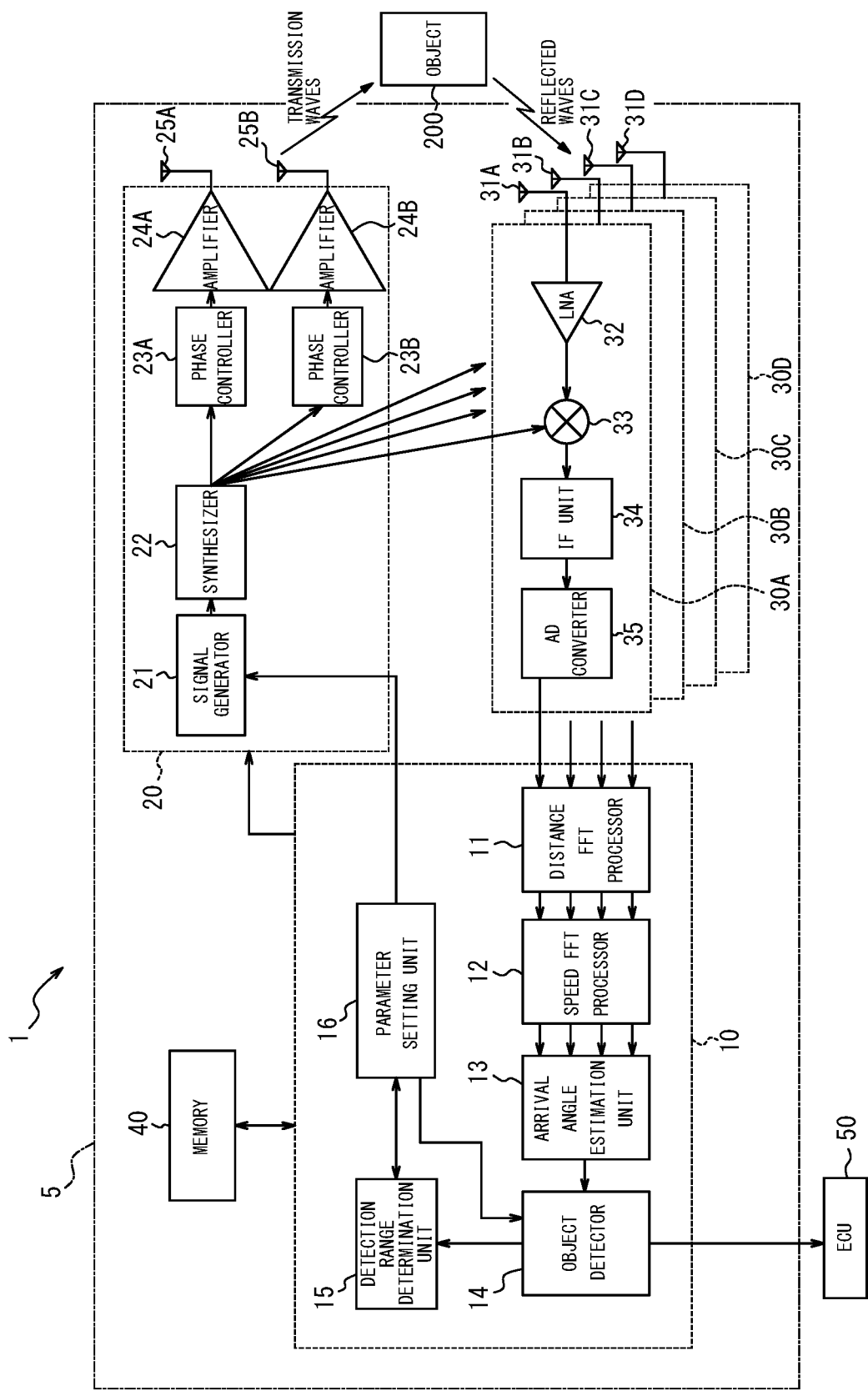
FIG. 2 is a functional block diagram schematically illustrating a structure of the electronic device according to the embodiment.

FIG. 2 is a functional block diagram schematically illustrating an example of the structure of the electronic device 1 according to the embodiment. The example of the structure of the electronic device 1 according to the embodiment will be described below.

When measuring distance or the like by millimeter wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81 GHz. Radar of 79 GHz in frequency band has a feature that its usable frequency bandwidth is broader than that of other millimeter wave/submillimeter wave radar of 24 GHz, 60 GHz, 76 GHz, etc. in frequency band. This embodiment will be described below.

The electronic device 1 according to the embodiment includes the sensor 5 and an electronic control unit (ECU) 50, as illustrated in FIG. 2. The ECU 50 controls various operations of the mobile body 100. The ECU 50 may be composed of one or more ECUs. The electronic device 1 according to the embodiment includes the controller 10. The electronic device 1 according to the embodiment may include other functional parts as appropriate, such as at least one of a transmitter 20, receivers 30A to 30D, and a memory 40. The electronic device 1 may include a plurality of receivers such as the receivers 30A to 30D, as illustrated in FIG. 2. Hereafter, in the case where the receivers 30A to 30D are not distinguished from one another, they are simply referred to as "receiver 30".

The controller 10 includes a distance FFT processor 11, a speed FFT processor 12, an arrival angle estimation unit 13, an object detector 14, a detection range determination unit 15, and a parameter setting unit 16. These functional parts included in the controller 10 will be described in detail later.

The transmitter 20 may include a signal generator 21, a synthesizer 22, phase controllers 23A and 23B, amplifiers 24A and 24B, and transmission antennas 25A and 25B, as illustrated in FIG. 2. Hereafter, in the case where the phase controllers 23A and 23B are not distinguished from each other, they are simply referred to as "phase controller 23". In the case where the amplifiers 24A and 24B are not distinguished from each other, they are simply referred to as "amplifier 24". In the case where the transmission antennas 25A and 25B are not distinguished from each other, they are simply referred to as "transmission antenna 25".

The respective receivers 30 may include corresponding reception antennas 31A to 31D, as illustrated in FIG. 2. Hereafter, in the case where the reception antennas 31A to 31D are not distinguished from one another, they are simply referred to as "reception antenna 31". The plurality of receivers 30 may each include a LNA 32, a mixer 33, an IF unit 34, and an AD converter 35, as illustrated in FIG. 2. The receivers 30A to 30D may have the same structure. FIG. 2 schematically illustrates only the structure of the receiver 30A as a typical example.

The sensor 5 may include, for example, the transmission antennas 25 and the reception antennas 31. The sensor 5 may include at least one of the other functional parts such as the controller 10, as appropriate.

The controller 10 included in the electronic device 1 according to the embodiment controls overall operation of the electronic device 1, including control of each of the functional parts included in the electronic device 1. The controller 10 may include at least one processor such as a central processing unit (CPU), to provide control and processing capacity for achieving various functions. The controller 10 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the controller 10 may be implemented, for example, by a CPU and a program executed by the CPU. The controller 10 may include a memory necessary for the operation of the controller 10.

The memory 40 may store the program executed by the controller 10, results of processes performed by the controller 10, and the like. The memory 40 may function as a work memory of the controller 10. The memory 40 may be implemented, for example, by a semiconductor memory, a magnetic disk, or the like. The memory 40 is, however, not limited to such, and may be any storage device. For example, the memory 40 may be a storage medium such as a memory card inserted in the electronic device 1 according to the embodiment. The memory 40 may be an internal memory of the CPU used as the controller 10 as described above.

In an embodiment, the memory 40 may store various parameters for setting the range of object detection by the transmission waves T transmitted by the transmission antenna 25 and the reflected waves R received by the reception antenna 31. Such parameters will be described in detail later.

In the electronic device 1 according to the embodiment, the controller 10 can control at least one of the transmitter 20 and the receiver 30. In this case, the controller 10 may control at least one of the transmitter 20 and the receiver 30 based on various information stored in the memory 40. In the electronic device 1 according to the embodiment, the controller 10 may instruct the signal generator 21 to generate a signal, or control the signal generator 21 to generate a signal.

The signal generator 21 generates a signal (transmission signal) transmitted from the transmission antenna 25 as the transmission waves T, based on control by the controller 10. When generating the transmission signal, for example, the signal generator 21 may assign the frequency of the transmission signal based on control by the controller 10. Specifically, the signal generator 21 may assign the frequency of the transmission signal according to a parameter set by the parameter setting unit 16. For example, the signal generator 21 receives frequency information from the controller 10 (the parameter setting unit 16), and generates a signal of a predetermined frequency in a frequency band of 77 GHz to 81 GHz. The signal generator 21 may include a functional part such as a voltage controlled oscillator (VCO).

The signal generator 21 may be configured as hardware having the function, configured as a microcomputer or the like, or configured as a processor such as a CPU and a program executed by the processor. Each functional part described below may be configured as hardware having the function, or, if possible, configured as a microcomputer or the like or configured as a processor such as a CPU and a program executed by the processor.

In the electronic device 1 according to the embodiment, the signal generator 21 may generate a transmission signal (transmission chirp signal) such as a chirp signal. In particular, the signal generator 21 may generate a signal (linear chirp signal) whose frequency linearly changes periodically. For example, the signal generator 21 may generate a chirp signal whose frequency linearly increases periodically from 77 GHz to 81 GHz with time. For example, the signal generator 21 may generate a signal whose frequency periodically repeats a linear increase (up-chirp) and decrease (down-chirp) from 77 GHz to 81 GHz with time. The signal generated by the signal generator 21 may be, for example, set by the controller 10 beforehand. The signal generated by the signal generator 21 may be, for example, stored in the memory 40 or the like beforehand. Since chirp signals used in technical fields such as radar are already known, more detailed description is simplified or omitted as appropriate. The signal generated by the signal generator 21 is supplied to the synthesizer 22.

Figure 3:
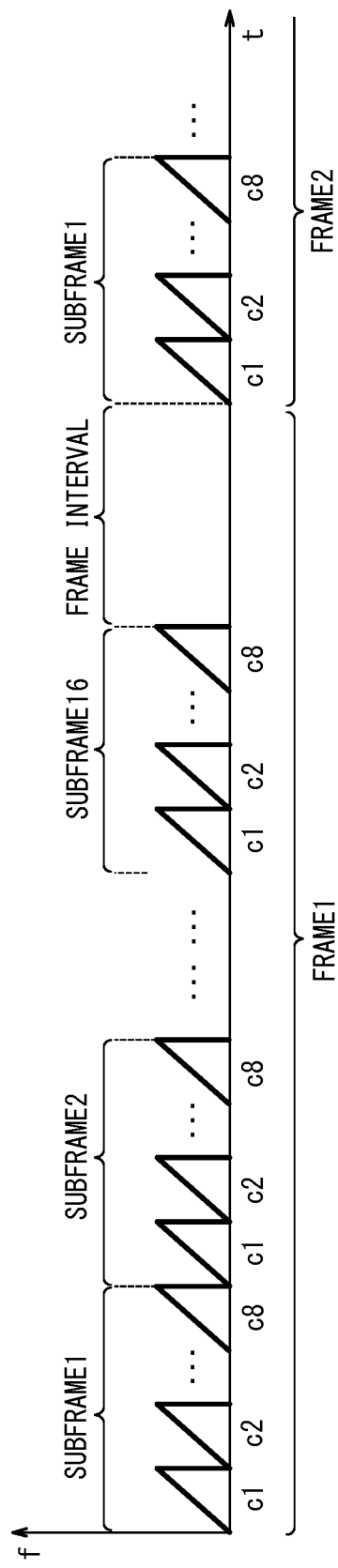
FIG. 3 is a diagram illustrating a structure of a transmission signal according to the embodiment.

FIG. 3 is a diagram illustrating an example of a chirp signal generated by the signal generator 21.

In FIG. 3, the horizontal axis represents elapsed time, and the vertical axis represents frequency. In the example illustrated in FIG. 3, the signal generator 21 generates a linear chirp signal whose frequency linearly changes periodically. In FIG. 3, chirp signals are designated as $c1, c2, \ldots, c8$. In each chirp signal, the frequency increases linearly with time, as illustrated in FIG. 3.

In the example illustrated in FIG. 3, eight chirp signals, e.g. $c1, c2, \ldots, c8$, are included in one subframe. That is, each of subframes 1, 2, etc. illustrated in FIG. 3 is composed of eight chirp signals $c1, c2, \ldots, c8$. In the example illustrated in FIG. 3, 16 subframes, e.g. subframes 1 to 16, are included in one frame. That is, each of frames 1, 2, etc. illustrated in FIG. 3 is composed of 16 subframes. Predetermined frame intervals may be provided between the frames, as illustrated in FIG. 3.

In FIG. 3, each subsequent frame from the frame 2 may have the same structure. In FIG. 3, each subsequent frame from the frame 3 may have the same structure. In the electronic device 1 according to the embodiment, the signal generator 21 may generate a transmission signal of any number of frames. In FIG. 3, some chirp signals are omitted. The relationship between the time and the frequency of the transmission signal generated by the signal generator 21 may be stored, for example, in the memory 40.

Thus, the electronic device 1 according to the embodiment may transmit a transmission signal composed of subframes each of which includes a plurality of chirp signals. The electronic device 1 according to the embodiment may transmit a transmission signal composed of frames each of which includes a predetermined number of subframes.

In the following description, it is assumed that the electronic device 1 transmits a transmission signal of the frame structure illustrated in FIG. 3. The frame structure illustrated in FIG. 3 is, however, an example. For example, the number of chirp signals included in one subframe is not limited to 8. In an embodiment, the signal generator 21 may generate a subframe including any number (e.g. a plurality) of chirp signals. The subframe structure illustrated in FIG. 3 is also an example. For example, the number of subframes included in one frame is not limited to 16. In an embodiment, the signal generator 21 may generate a frame including any number (e.g. a plurality) of subframes.

The signal generator 21 generates the transmission signal based on a signal received from the controller 10, e.g. the parameter setting unit 16. The transmission signal may be a chirp signal. The chirp signal is a signal whose frequency changes continuously with time. FIG. 3 illustrates a chirp signal whose frequency increases linearly with time. The chirp signal is also referred to as "frequency-modulated continuous wave (FMCW)". The change in frequency of the chirp signal may be increasing or decreasing, or a combination of increasing and decreasing. The chirp signal may include a linear chirp signal whose frequency changes linearly with time, an exponential chirp signal whose frequency changes exponentially with time, or the like. In the case where the transmission signal is a chirp signal, as information for generating a chirp signal in each operation mode, parameters such as start frequency, end frequency, and duration may be stored in the memory 40 as information relating to the operation mode.

The signal generated by the signal generator 21 is not limited to a FMCW signal. The signal generated by the signal generator 21 may be a signal of any of various systems such as a pulse system, a pulse compression system (spread spectrum system), and a frequency continuous wave (CW) system. When measuring distance or the like by millimeter wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81 GHz. Radar of 79 GHz in frequency band has a feature that its usable frequency bandwidth is broader than that of other millimeter wave/submillimeter wave radar of 24 GHz, 60 GHz, 76 GHz, etc. in frequency band. This embodiment will be described below.

The FMCW radar system used in the present disclosure may include a fast-chirp modulation (FCM) system that transmits a chirp signal in a cycle shorter than normal. The signal generated by the signal generator 21 is not limited to a FM-CW signal. The signal generated by the signal generator 21 may be a signal of any of various systems other than FM-CW. A transmission signal sequence stored in the memory 40 may be different depending on the system used. For example, in the case of a FM-CW radar signal, a signal whose frequency increases and a signal whose frequency decreases for each time sample may be used. Well-known techniques can be appropriately applied to the foregoing various systems, and therefore more detailed description is omitted.

Referring back to FIG. 2, the synthesizer 22 increases the frequency of the signal generated by the signal generator 21 to a frequency in a predetermined frequency band. The synthesizer 22 may increase the frequency of the signal generated by the signal generator 21 to a frequency selected as the frequency of the transmission waves T transmitted from the transmission antenna 25. The frequency selected as the frequency of the transmission waves T transmitted from the transmission antenna 25 may be, for example, set by the controller 10. For example, the frequency selected as the frequency of the transmission waves T transmitted from the transmission antenna 25 may be a frequency selected by the parameter setting unit 16. The frequency selected as the frequency of the transmission waves T transmitted from the transmission antenna 25 may be, for example, stored in the memory 40. The signal increased in frequency by the synthesizer 22 is supplied to the phase controller 23 and the mixer 33. In the case where there are a plurality of phase controllers 23, the signal increased in frequency by the synthesizer 22 may be supplied to each of the plurality of phase controllers 23. In the case where there are a plurality of receivers 30, the signal increased in frequency by the synthesizer 22 may be supplied to the mixer 33 in each of the plurality of receivers 30.

The phase controller 23 controls the phase of the transmission signal supplied from the synthesizer 22. Specifically, the phase controller 23 may, for example, adjust the phase of the transmission signal by advancing or delaying the phase of the signal supplied from the synthesizer 22 as appropriate, based on control by the controller 10. In this case, based on the path difference between the transmission waves T transmitted from the plurality of transmission antennas 25, the phase controllers 23 may adjust the phases of the respective transmission signals. As a result of the phase controllers 23 adjusting the phases of the respective transmission signals as appropriate, the transmission waves T transmitted from the plurality of transmission antennas 25 intensify each other and form a beam in a predetermined direction (i.e. beamforming). In this case, the correlation between the beamforming direction and the amount of phase to be controlled in the transmission signal transmitted from each of the plurality of transmission antennas 25 may be stored in, for example, the memory 40. The transmission signal phase-controlled by the phase controller 23 is supplied to the amplifier 24.

The amplifier 24 amplifies the power of the transmission signal supplied from the phase controller 23, for example based on control by the controller 10. In the case where the sensor 5 includes a plurality of transmission antennas 25, a plurality of amplifiers 24 may each amplify the power of the transmission signal supplied from a corresponding one of the plurality of phase controllers 23, for example based on control by the controller 10. The technique of amplifying the power of the transmission signal is known, and therefore its more detailed description is omitted. The amplifier 24 is connected to the transmission antenna 25.

The transmission antenna 25 outputs (transmits) the transmission signal amplified by the amplifier 24, as the transmission waves T. In the case where the sensor 5 includes a plurality of transmission antennas 25, each of the plurality of transmission antennas 25 may output (transmit) the transmission signal amplified by a corresponding one of the plurality of amplifiers 24, as the transmission waves T. Since the transmission antenna 25 can be configured in the same way as transmission antennas used in known radar techniques, more detailed description is omitted.

Thus, the electronic device 1 according to the embodiment includes the transmission antenna 25, and can transmit the transmission signal (e.g. transmission chirp signal) from the transmission antenna 25 as the transmission waves T. At least one of the functional parts included in the electronic device 1 may be contained in one housing. The housing may have a structure that cannot be opened easily. For example, the transmission antenna 25, the reception antenna 31, and the amplifier 24 may be contained in one housing having a structure that cannot be opened easily. In the case where the sensor 5 is installed in the mobile body 100 such as a car, the transmission antenna 25 may transmit the transmission waves T to outside the mobile body 100 through a cover member such as a radar cover. In this case, the radar cover may be made of a material that allows electromagnetic waves to pass through, such as synthetic resin or rubber. For example, the radar cover may be a housing of the sensor 5. By covering the transmission antenna 25 with a member such as a radar cover, the risk that the transmission antenna 25 breaks or becomes defective due to external contact can be reduced. The radar cover and the housing are also referred to as "radome".

In the example illustrated in FIG. 2, the electronic device 1 includes two transmission antennas 25. In an embodiment, however, the electronic device 1 may include any number of transmission antennas 25. In an embodiment, the electronic device 1 may include a plurality of transmission antennas 25 in the case of forming, in a predetermined direction, a beam of the transmission waves T transmitted from the transmission antennas 25. In an embodiment, the electronic device 1 may include any number of transmission antennas 25, where the number is 2 or more. In this case, the electronic device 1 may include a plurality of phase controllers 23 and a plurality of amplifiers 24 corresponding to the plurality of transmission antennas 25. The plurality of phase controllers 23 may control the phases of the plurality of transmission waves supplied from the synthesizer 22 and transmitted from the respective plurality of transmission antennas 25. The plurality of amplifiers 24 may amplify the powers of the plurality of transmission signals transmitted from the respective plurality of transmission antennas 25. In this case, the sensor 5 may include the plurality of transmission antennas. Thus, in the case where the electronic device 1 illustrated in FIG. 2 includes the plurality of transmission antennas 25, the electronic device 1 may equally include the pluralities of functional parts necessary for transmitting the transmission waves T from the plurality of transmission antennas 25.

The reception antenna 31 receives reflected waves R. The reflected waves R result from reflection of the transmission waves T off the object 200. The reception antenna 31 may include a plurality of antennas such as the reception antennas 31A to 31D. Since the reception antenna 31 can be configured in the same way as reception antennas used in known radar techniques, more detailed description is omitted. The reception antenna 31 is connected to the LNA 32. A reception signal based on the reflected waves R received by the reception antenna 31 is supplied to the LNA 32.

The electronic device 1 according to the embodiment can receive the reflected waves R as a result of the transmission waves T transmitted as the transmission signal such as a chirp signal (transmission chirp signal) being reflected off the object 200, by the plurality of reception antennas 31. In the case where the transmission chirp signal is transmitted as the transmission waves T, the reception signal based on the received reflected waves R is referred to as "reception chirp signal". That is, the electronic device 1 receives the reception signal (e.g. reception chirp signal) by the reception antenna 31 as the reflected waves R. In the case where the sensor 5 is installed in the mobile body 100 such as a car, the reception antenna 31 may receive the reflected waves R from outside the mobile body 100 through a cover member such as a radar cover. In this case, the radar cover may be made of a material that allows electromagnetic waves to pass through, such as synthetic resin or rubber. For example, the radar cover may be a housing of the sensor 5. By covering the reception antenna 31 with a member such as a radar cover, the risk that the reception antenna 31 breaks or becomes defective due to external contact can be reduced. The radar cover and the housing are also referred to as "radome".

In the case where the reception antenna 31 is installed near the transmission antenna 25, these antennas may be included in one sensor 5 in combination. For example, one sensor 5 may include at least one transmission antenna 25 and at least one reception antenna 31. For example, one sensor 5 may include a plurality of transmission antennas 25 and a plurality of reception antennas 31. In such a case, for example, one radar sensor may be covered with one cover member such as a radar cover.

The LNA 32 amplifies the reception signal based on the reflected waves R received by the reception antenna 31, with low noise. The LNA 32 may be a low-noise amplifier, and amplifies the reception signal supplied from the reception antenna 31 with low noise. The reception signal amplified by the LNA 32 is supplied to the mixer 33.

The mixer 33 mixes (multiplies) the reception signal of RF frequency supplied from the LNA 32 and the transmission signal supplied from the synthesizer 22, to generate a beat signal. The beat signal generated by the mixer 33 is supplied to the IF unit 34.

The IF unit 34 performs frequency conversion on the beat signal supplied from the mixer 33, to lower the frequency of the beat signal to intermediate frequency (IF). The beat signal lowered in frequency by the IF unit 34 is supplied to the AD converter 35.

The AD converter 35 digitizes the analog beat signal supplied from the IF unit 34. The AD converter 35 may include any analog-to-digital converter (ADC). The beat signal digitized by the AD converter 35 is supplied to the distance FFT processor 11 in the controller 10. In the case where there are the plurality of receivers 30, the respective beat signals digitized by the plurality of AD converters 35 may be supplied to the distance FFT processor 11.

The distance FFT processor 11 estimates the distance between the mobile body 100 having the electronic device 1 mounted therein and the object 200, based on the beat signal supplied from the AD converter 35. The distance FFT processor 11 may include, for example, a processor that performs a fast Fourier transform (FFT). In this case, the distance FFT processor 11 may be composed of any circuit, chip, or the like for performing FFT processing.

The distance FFT processor 11 performs FFT processing (hereafter also referred to as "distance FFT processing") on the beat signal digitized by the AD converter 35. For example, the distance FFT processor 11 may perform FFT processing on the complex signal supplied from the AD converter 35. The beat signal digitized by the AD converter 35 can be expressed as the temporal change of the signal intensity (power). As a result of the distance FFT processor 11 performing FFT processing on such a beat signal, the signal intensity (power) corresponding to each frequency can be expressed. In the case where the peak of the result obtained by the distance FFT processing is greater than or equal to a predetermined threshold, the distance FFT processor 11 may determine that the object 200 is present at a distance corresponding to the peak. For example, there is a known method that, upon detecting a peak value greater than or equal to a threshold from an average power or amplitude of a disturbance signal, determines that there is an object (reflecting object) reflecting transmission waves, as in constant false alarm rate (CFAR) detection. The distance FFT processor 11 may perform a Fourier transform other than a fast Fourier transform.

Thus, the electronic device 1 according to the embodiment can detect the object 200 reflecting the transmission waves T, based on the transmission signal transmitted as the transmission waves T and the reception signal received as the reflected waves R.

The distance FFT processor 11 can estimate the distance from the object based on one chirp signal (e.g. c1 in FIG. 3). That is, the electronic device 1 can measure (estimate) the distance L illustrated in FIG. 1, by performing distance FFT processing. Since the technique of measuring (estimating) the distance from a certain object by performing FFT processing on a beat signal is well known, more detailed description is simplified or omitted as appropriate. The result (e.g. distance information) of performing distance FFT processing by the distance FFT processor 11 may be supplied to the speed FFT processor 12. The result of performing distance FFT processing by the distance FFT processor 11 may be also supplied to the object detector 14.

The speed FFT processor 12 estimates the relative speed of the mobile body 100 having the electronic device 1 mounted therein and the object 200, based on the beat signal subjected to distance FFT processing by the distance FFT processor 11. The speed FFT processor 12 may include, for example, a processor that performs a fast Fourier transform (FFT). In this case, the speed FFT processor 12 may be composed of any circuit, chip, or the like for performing FFT processing. The speed FFT processor 12 may perform a Fourier transform other than a fast Fourier transform.

The speed FFT processor 12 performs FFT processing (hereafter also referred to as "speed FFT processing") on the beat signal subjected to distance FFT processing by the distance FFT processor 11. For example, the speed FFT processor 12 may perform FFT processing on the complex signal supplied from the distance FFT processor 11. The speed FFT processor 12 can estimate the relative speed with respect to the object, based on a subframe of chirp signals (e.g. subframe 1 in FIG. 3). As a result of performing distance FFT processing on the beat signal as mentioned above, a plurality of vectors can be generated. By finding the phase of a peak in the result of subjecting the plurality of vectors to speed FFT processing, the relative speed with respect to the object can be estimated. That is, the electronic device 1 can measure (estimate) the relative speed of the mobile body 100 and the object 200 illustrated in FIG. 1, by performing speed FFT processing. Since the technique of measuring (estimating) the relative speed with respect to a certain object by performing speed FFT processing on a result of distance FFT processing is well known, more detailed description is simplified or omitted as appropriate. The result (e.g. speed information) of performing speed FFT processing by the speed FFT processor 12 may be supplied to the arrival angle estimation unit 13. The result of performing speed FFT processing by the speed FFT processor 12 may be also supplied to the object detector 14.

The arrival angle estimation unit 13 estimates the direction in which the reflected waves R reach from the object 200, based on the result of speed FFT processing by the speed FFT processor 12. The electronic device 1 can estimate the direction in which the reflected waves R reach, by receiving the reflected waves R from the plurality of reception antennas 31. For example, suppose the plurality of reception antennas 31 are arranged at predetermined intervals. The transmission waves T transmitted from the transmission antenna 25 are reflected off the object 200 to become the reflected waves R, which are received by each of the plurality of reception antennas 31 arranged at the predetermined intervals. Based on the phase of the reflected waves R received by each of the plurality of reception antennas 31 and the path difference between the reflected waves R of the plurality of reception antennas 31, the arrival angle estimation unit 13 can estimate the direction in which the reflected waves R reach the reception antennas 31. That is, the electronic device 1 can measure (estimate) the arrival angle $\theta$ illustrated in FIG. 1, based on the result of speed FFT processing.

There are various proposed techniques of estimating the direction in which the reflected waves R reach based on the result of speed FFT processing. Examples of known arrival direction estimation algorithms include multiple signal classification (MUSIC) and estimation of signal parameters via rotational invariance technique (ESPRIT). Detailed description of such known techniques is simplified or omitted as appropriate. Information (angle information) of the arrival angle θ estimated by the arrival angle estimation unit 13 may be supplied to the object detector 14.

The object detector 14 detects an object present in the range in which the transmission waves T are transmitted, based on the information supplied from at least one of the distance FFT processor 11, the speed FFT processor 12, and the arrival angle estimation unit 13. For example, the object detector 14 may detect the object by performing clustering processing based on the supplied distance information, speed information, and angle information. As an algorithm used when clustering data, for example, density-based spatial clustering of applications with noise (DBSCAN) is known. In clustering processing, for example, the average power of points constituting the detected object may be calculated. The distance information, speed information, angle information, and power information of the object detected by the object detector 14 may be supplied to the detection range determination unit 15. The distance information, speed information, angle information, and power information of the object detected by the object detector 14 may be supplied to the ECU 50. In the case where the mobile body 100 is a car, the communication may be performed using a communication interface such as CAN (Controller Area Network).

The detection range determination unit 15 determines the range (hereafter also referred to as "object detection range") of detecting an object reflecting the transmission waves T based on the transmission signal and the reception signal. The detection range determination unit 15 may determine the object detection range based on, for example, an operation by the driver of the mobile body 100 in which the electronic device 1 is mounted. For example, in the case where the driver of the mobile body 100 or the like operates a parking assistance button, the detection range determination unit 15 may determine the object detection range appropriate for parking assistance. The detection range determination unit 15 may determine the object detection range based on, for example, an instruction from the ECU 50. For example, in the case where the ECU 50 determines that the mobile body 100 is about to be reversed, the detection range determination unit 15 may determine, based on an instruction from the ECU 50, the object detection range appropriate when reversing the mobile body 100. The detection range determination unit 15 may determine the object detection range based on, for example, a change in the operating state of the steering, the accelerator, of the gear in the mobile body 100 or any combination thereof. Moreover, the detection range determination unit 15 may determine the object detection range based on the result of object detection by the object detector 14.

The parameter setting unit 16 sets various parameters defining the transmission signal and the reception signal for detecting the object reflecting the transmission waves T as the reflected waves R. In detail, the parameter setting unit 16 sets various parameters for transmitting the transmission waves T by the transmission antenna 25 and various parameters for receiving the reflected waves R by the reception antenna 31.

In particular, in an embodiment, the parameter setting unit 16 may set various parameters relating to the transmission of the transmission waves T and the reception of the reflected waves R, in order to perform object detection in the foregoing object detection range. For example, the parameter setting unit 16 may define the range of receiving the reflected waves R, in order to receive the reflected waves R and detect an object in the object detection range. For example, the parameter setting unit 16 may define the range of aiming the beam of the transmission waves T, in order to transmit the transmission waves T from the plurality of transmission antennas 25 and detect an object in the object detection range. The parameter setting unit 16 may set various parameters for performing the transmission of the transmission waves T and the reception of the reflected waves R.

The parameters set by the parameter setting unit 16 may be supplied to the signal generator 21. Thus, the signal generator 21 can generate the transmission signal transmitted as the transmission waves T based on the parameters set by the parameter setting unit 16. The parameters set by the parameter setting unit 16 may be supplied to the object detector 14. Thus, the object detector 14 can perform the process of object detection in the object detection range determined based on the parameters set by the parameter setting unit 16.

The ECU 50 included in the electronic device 1 according to the embodiment controls overall operation of the mobile body 100, including control of each of the functional parts included in the mobile body 100. The ECU 50 may include at least one processor such as a central processing unit (CPU), to provide control and processing capacity for achieving various functions. The ECU 50 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the ECU 50 may be implemented, for example, by a CPU and a program executed by the CPU. The ECU 50 may include a memory necessary for the operation of the ECU 50. The ECU 50 may have at least part of the functions of the controller 10, and the controller 10 may have at least part of the functions of the ECU 50.

Although the electronic device 1 illustrated in FIG. 2 includes two transmission antennas 25 and four reception antennas 31, the electronic device 1 according to the embodiment may include any number of transmission antennas 25 and any number of reception antennas 31. For example, the inclusion of two transmission antennas 25 and four reception antennas 31 enables the electronic device 1 to have a virtual antenna array composed of eight antennas virtually. For example, the electronic device 1 may receive the reflected waves R of 16 subframes illustrated in FIG. 3, by using the virtual eight antennas.

Operation of the electronic device 1 according to the embodiment will be described below.

In recent years, there are various sensors capable of detecting obstacles present around vehicles such as cars, e.g. millimeter wave radar, lidar (light detection and ranging, laser imaging detection and ranging), and ultrasonic sensors. Of these sensors, millimeter wave radar is often used from the viewpoint of accuracy and reliability in obstacle detection, cost, and the like.

Examples of techniques of detecting obstacles and the like around vehicles using millimeter wave radar include blind spot detection (BSD), lateral direction detection (cross traffic alert: CTA) during reversing or departure, and free space detection (FSD). In these types of detection, typically a radio wave radiation range that depends on the physical shape of antennas of millimeter wave radar is set beforehand to determine an object detection range. In detail, in typical specifications, for each radar system, the physical shape of antennas of millimeter wave radar is predetermined depending on the application, function, etc. of the radar, and an object detection range is predefined. Therefore, a plurality of different radar sensors are needed in order to achieve a plurality of different radar functions.

It is, however, disadvantageous in terms of cost to prepare a plurality of radar sensors for different applications or functions. Moreover, for example, when the physical shape of the antennas is predetermined and the radiation range is predetermined, it is difficult to change the application and function of the antennas. For example, in the case where the physical shape and radiation range of the antenna are predetermined and all target objects in the radiation range are detected, the amount of information to be processed increases. In such a case, there is a possibility that unnecessary objects are erroneously detected as target objects. This can cause a decrease in detection reliability. Moreover, for example, in the case where the physical shape and radiation range of the antennas are predetermined and the number of sensors installed is increased, the fuel efficiency may decrease due to an increase of the weight of the vehicle (mainly the harness) or an increase of the power consumption. Further, if detection is performed using the plurality of radar sensors, a delay can occur between the sensors. When automatic driving, driving assistance, or the like is performed based on such detection, processing is likely to take time. This is because the CAN processing speed is slower than the radar update rate, and also feedback requires time. If detection is performed using a plurality of sensors with different object detection ranges, control tends to be complex.

In view of this, the electronic device 1 according to the embodiment enables one radar sensor to be used for a plurality of functions or applications.

Figure 4:
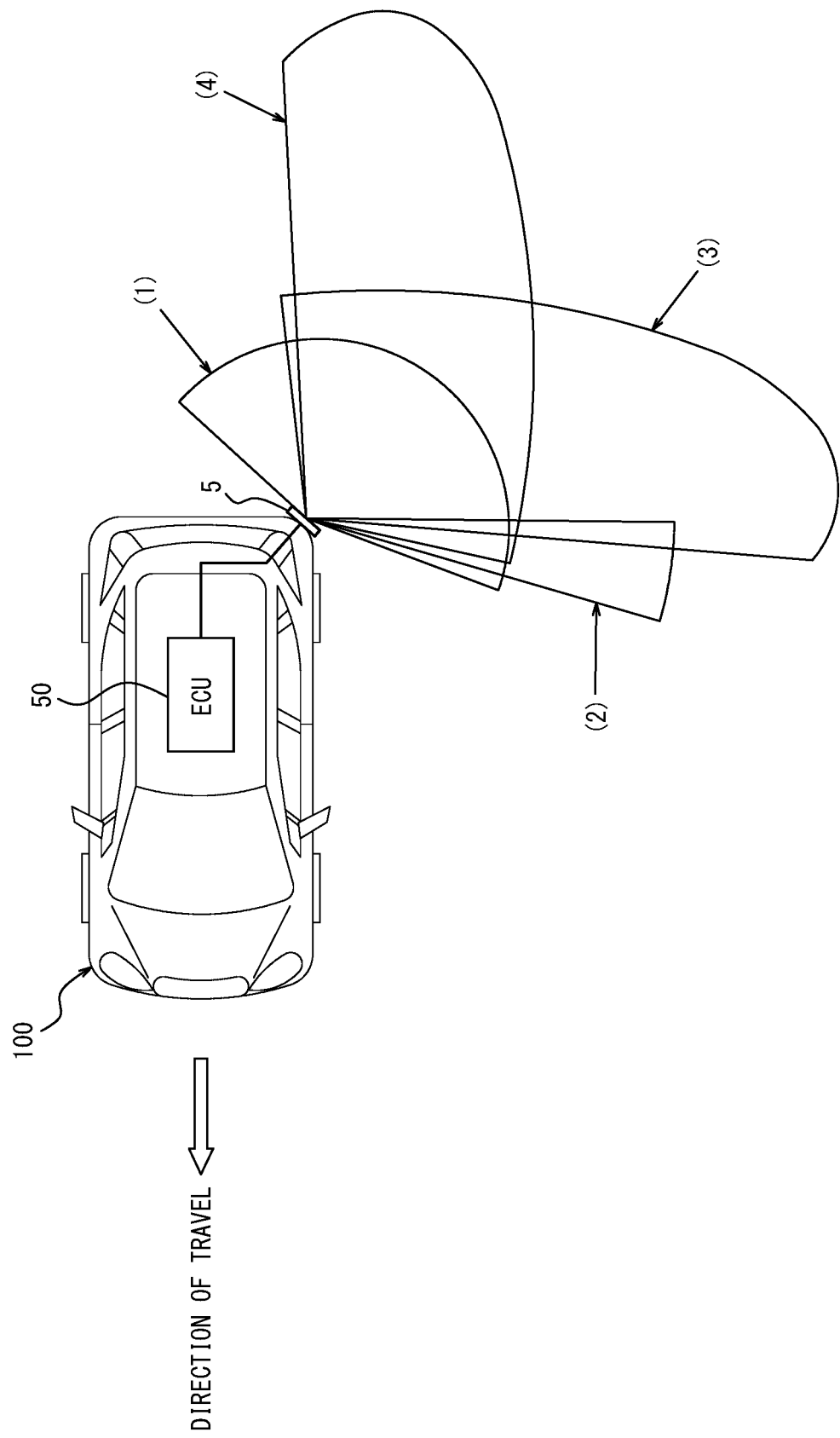
FIG. 4 is a diagram illustrating an example of operation of the electronic device according to the embodiment.

FIG. 4 is a diagram illustrating an example of operation of the electronic device 1 according to the embodiment.

The mobile body 100 illustrated in FIG. 4 has the electronic device 1 according to the embodiment mounted therein. At least one sensor 5 is installed on the back left side of the mobile body 100, as illustrated in FIG. 4. The sensor 5 is connected to the ECU 50 mounted in the mobile body 100, as illustrated in FIG. 4. Besides the sensor 5 installed on the back left side, the sensor 5 that operates in the same way as the sensor 5 on the back left side may be installed in the mobile body 100 illustrated in FIG. 4. The following will describe only one sensor 5 installed on the back left side, while omitting the description of other sensors. In the following description, it is assumed that each functional part included in the electronic device 1 can be controlled by at least one of the controller 10, the phase controller 23, and the ECU 50.

As illustrated in FIG. 4, the electronic device 1 according to the embodiment can select any of a plurality of detection ranges and perform object detection. The electronic device 1 according to the embodiment can switch between the plurality of detection ranges to perform object detection. The ranges of detecting objects by the transmission signal transmitted by the electronic device 1 (the sensor 5) according to the embodiment and the reception signal received by the electronic device 1 (the sensor 5) are illustrated in FIG. 4.

For example, in the case of using the sensor 5 for parking assistance, the electronic device 1 according to the embodiment can perform object detection using a range (1) illustrated in FIG. 4 as the object detection range of the sensor 5. The object detection range (1) illustrated in FIG. 4 may be, for example, the same as or similar to the object detection range of radar specifically designed for parking assistance. For example, in the case of using the sensor 5 for free space detection (FSD), the electronic device 1 according to the embodiment can perform object detection using a range (2) illustrated in FIG. 4 as the object detection range of the sensor 5. The object detection range (2) illustrated in FIG. 4 may be, for example, the same as or similar to the object detection range of radar specifically designed for free space detection (FSD).

For example, in the case of using the sensor 5 for cross traffic alert (CTA), the electronic device 1 according to the embodiment can perform object detection using a range (3) illustrated in FIG. 4 as the object detection range of the sensor 5. The object detection range (3) illustrated in FIG. 4 may be, for example, the same as or similar to the object detection range of radar specifically designed for cross traffic alert (CTA). For example, in the case of using the sensor 5 for blind spot detection (BSD), the electronic device 1 according to the embodiment can perform object detection using a range (4) illustrated in FIG. 4 as the object detection range of the sensor 5. The object detection range (4) illustrated in FIG. 4 may be, for example, the same as or similar to the object detection range of radar specifically designed for blind spot detection (BSD).

The electronic device 1 according to the embodiment may switch among the object detection ranges (1) to (4) illustrated in FIG. 4 to perform object detection. The switching may be based on an operation of the driver of the mobile body 100 or the like, or based on an instruction from the controller 10, the ECU 50, or the like, as mentioned above. The electronic device 1 according to the embodiment may switch among the object detection ranges (1) to (4) illustrated in FIG. 4, based on the speed of the mobile body 100, the position of the mobile body 100, the time period, the state of the gear, the steering angle of the steering wheel, the position of an object around the mobile body 100, or any combination thereof.

In the case where the electronic device 1 according to the embodiment performs object detection using any of the plurality of object detection ranges (1) to (4), the detection range determination unit 15 may determine which object detection range is to be used, based on any information. After the detection range determination unit 15 determines the object detection range, the parameter setting unit 16 sets various parameters for performing the transmission of the transmission signal and the reception of the reception signal in the determined object detection range. The parameters set by the parameter setting unit 16 may be stored, for example, in the memory 40.

The parameters may be determined, for example, based on actual measurement in a test environment, before object detection by the electronic device 1. In the case where the parameters are not stored in the memory 40, the parameter setting unit 16 may estimate the parameters as appropriate based on predetermined data such as past measurement data. In the case where the parameters are not stored in the memory 40, the parameter setting unit 16 may acquire appropriate parameters through, for example, network connection to the outside.

Thus, in an embodiment, the controller 10 detects the object reflecting the transmission waves T based on the transmission signal transmitted as the transmission waves T and the reception signal received as the reflected waves R. Moreover, in an embodiment, the controller 10 makes the object detection range (e.g. the object detection ranges (1) to (4) in FIG. 4) by the transmission signal and the reception signal variable. In the present disclosure, the expression "make the object detection range variable" may denote both that the object detection range is changeable and that the object detection range is changed.

In an embodiment, the controller 10 may switch between the plurality of object detection ranges. For example, when object detection is performed in the object detection range (3), the controller 10 may switch the range of object detection from the object detection range (3) to the object detection range (2). In an embodiment, the controller 10 may make the object detection range variable depending on at least one of the object detection purposes (e.g. parking assistance (PA) and blind spot detection (BSD)). The controller 10 may determine the range of detection, parking assistance, free space detection (FSD), cross traffic alert (CTA), and/or blind spot detection (BSD), based on the driver's optional selection or handling or gear information. For example, to cover more distant detection in BSD, the controller 10 may improve distant detection accuracy by beamforming. Further, as an object detection process in step S5 in FIG. 6, the controller 10 may, when transmitting CAN information, perform filtering (cutout) so as to transmit only data in the range of parking assistance, FSD, CTA, or BSD illustrated in FIG. 4. In the filtering (cutout), the controller 10 may perform selection based on distance measurement and/or angle measurement information actually received by radar. The controller 10 may exclude unnecessary data outside the range depending on the use case, thus avoiding excessive information transmission.

In an embodiment, the controller 10 may determine the object detection range based on an object detection result. For example, in the case where a certain object has already been detected as a result of object detection, the controller 10 may determine the object detection range depending on the position of the detected object. In an embodiment, the controller 10 may process only the transmission signal and the reception signal in the object detection range.

Thus, the electronic device 1 according to the embodiment can clip (set and/or switch) the detection range in object detection by millimeter wave radar or the like. The electronic device 1 according to the embodiment can therefore flexibly respond to such a situation where it is desirable to change the object detection range. Moreover, the electronic device 1 according to the embodiment can set a wide object detection range beforehand, and clip only information in a range that needs to be detected based on, for example, information of distance and/or angle detected by the electronic device 1. Hence, the electronic device 1 according to the embodiment can process information in the necessary detection range, without an increase of processing load. The electronic device 1 according to the embodiment can therefore improve the convenience in object detection.

FIG. 5 is a diagram illustrating another example of operation of the electronic device 1 according to the embodiment.

The electronic device 1 according to the embodiment may not only make the object detection range by the transmission signal and the reception signal variable as illustrated in FIG. 4, but also aim the beam of the transmission waves T at the object detection range. This enables highly accurate object detection in the desired cutout range.

The mobile body 100 illustrated in FIG. 5 has the electronic device 1 according to the embodiment mounted therein, as with the mobile body 100 illustrated in FIG. 4. The following will describe only one sensor 5 installed on the back left side of the mobile body 100, while omitting the description of other sensors.

As illustrated in FIG. 5, for example, the electronic device 1 according to the embodiment can select the object detection range (4) from the plurality of detection ranges and perform object detection for the application or function of blind spot detection (BSD). The electronic device 1 according to the embodiment may further form (beamforming) a beam of the transmission waves T transmitted from the plurality of transmission antennas 25, in the direction of the object detection range (4). In FIG. 5, while performing object detection in the object detection range (4), the sensor 5 forms a beam B4 of the transmission waves T transmitted from the plurality of transmission antennas 25. For example, in the case of performing distant object detection, the object detection range can be covered with high accuracy by performing beamforming by the beam of the transmission waves transmitted from the plurality of transmission antennas 25 in the direction of the object detection range.

In the electronic device 1 according to the embodiment, in the case of beamforming the transmission waves T transmitted from the plurality of transmission antennas 25, the transmission waves T of the plurality of transmission antennas 25 may be in phase with each other in a predetermined direction based on the path difference when transmitting the transmission waves T of the plurality of transmission antennas 25. In the electronic device 1 according to the embodiment, for example, the phase controller 23 may control the phase of the transmission waves transmitted from at least one of the plurality of transmission antennas 25 so that the transmission waves T of the plurality of transmission antennas 25 will be in phase with each other in the predetermined direction.

The amount of phase controlled so that the plurality of transmission waves T will be in phase with each other in the predetermined direction may be stored in the memory 40 in association with the predetermined direction. That is, the relationship between the beam direction and the phase amount when performing beamforming may be stored in the memory 40.

The relationship may be determined, for example, based on actual measurement in a test environment, before object detection by the electronic device 1. In the case where the relationship is not stored in the memory 40, the phase controller 23 may estimate the relationship as appropriate based on predetermined data such as past measurement data. In the case where the relationship is not stored in the memory 40, the phase controller 23 may acquire an appropriate relationship through, for example, network connection to the outside.

In the electronic device 1 according to the embodiment, at least one of the controller 10 and the phase controller 23 may perform control to beamform the transmission waves T transmitted from the plurality of transmission antennas 25. In the electronic device 1 according to the embodiment, a functional part including at least the phase controller 23 is also referred to as "transmission controller".

Thus, in the electronic device 1 according to the embodiment, the transmission antenna 25 may include a plurality of transmission antennas. Moreover, in the electronic device 1 according to the embodiment, the reception antenna 31 may include a plurality of reception antennas. In the electronic device 1 according to the embodiment, the transmission controller (e.g. the phase controller 23) may perform control to form (beamforming) a beam of the transmission waves T transmitted from the plurality of transmission antennas 25 in the predetermined direction. In the electronic device 1 according to the embodiment, the transmission controller (e.g. the phase controller 23) may form the beam in the direction of the object detection range.

In the electronic device 1 according to the embodiment, the transmission controller (e.g. the phase controller 23) may form the beam in a direction that covers at least part of the object detection range. In the electronic device 1 according to the embodiment, the transmission controller (e.g. the phase controller 23) may control the phase of the transmission waves transmitted from at least one of the plurality of transmission antennas 25 so that the transmission waves T of the plurality of transmission antennas 25 will be in phase with each other in the predetermined direction.

The electronic device 1 according to the embodiment can calculate a phase compensation value based on frequency information of a wide frequency band signal (e.g. FMCW signal) output from the plurality of transmitting antennas 25, and perform frequency-dependent phase compensation on each of the plurality of transmitting antennas. In this way, beamforming can be performed with high accuracy in a specific direction in all possible frequency bands of the transmission signal.

With such beamforming, the distance within which object detection is possible can be expanded in a specific direction in which object detection is required. Moreover, with such beamforming, a reflection signal from any unnecessary direction can be reduced. This improves the distance/angle detection accuracy.

As described above, the electronic device 1 according to the embodiment can clip a detection range and perform beamforming in the direction of the clipped detection range, depending on any of various applications or functions. The electronic device 1 according to the embodiment can also freely switch the detection range cutout and the beamforming in the direction of the clipped detection range. Hence, for example, one radar sensor can be dynamically switched between a plurality of applications or functions and used. The electronic device 1 according to the embodiment can therefore improve the convenience in object detection. Moreover, the electronic device 1 according to the embodiment not only achieves highly accurate object detection but also has a considerable cost advantage.

The electronic device 1 according to the embodiment can change the application and function of one sensor, by appropriately changing the direction of the beam of the transmission waves transmitted from the plurality of transmission antennas or switching the object detection range. The electronic device 1 according to the embodiment can detect only a specific part in the range of transmission of the transmission waves T, so that an increase of the amount of information processed is prevented. With the electronic device 1 according to the embodiment, the possibility of erroneously detecting an unnecessary object as a target object is reduced, with it being possible to improve the detection reliability.

The electronic device 1 according to the embodiment can perform object detection using one sensor 5 as if it were a plurality of sensors. Thus, with the electronic device 1 according to the embodiment, an increase of the weight of the vehicle (particularly the harness) is prevented. The electronic device 1 according to the embodiment can therefore prevent a decrease in fuel efficiency due to an increase in the number of sensors 5 or a decrease in fuel efficiency due to an increase in power consumption.

The electronic device 1 according to the embodiment can integrate the functions of a plurality of radar sensors into one sensor. Hence, a delay that may occur between a plurality of sensors can be avoided. The problem in that it takes an excessive processing time when performing automatic driving, driving assistance, or the like can also be avoided. Furthermore, with the electronic device 1 according to the embodiment, complex control as in the case of performing detection using a plurality of sensors with different object detection ranges can be avoided.

FIG. 6 is a flowchart illustrating operation of the electronic device according to the embodiment. The flow of operation of the electronic device according to the embodiment will be described below.

The operation illustrated in FIG. 6 may be started, for example, when detecting an object around the mobile body 100 by the electronic device 1 mounted in the mobile body 100.

Upon the start of the operation illustrated in FIG. 6, the detection range determination unit 15 in the controller 10 determines an object detection range (step S1). For example, in step S1, the detection range determination unit 15 may determine any of the object detection ranges (1) to (4) illustrated in FIG. 4, as the object detection range. In step S1, the detection range determination unit 15 may determine the object detection range based on, for example, an operation of the driver of the mobile body 100 or an instruction of the controller 10 or the ECU 50.

The operation in step S1 may be not an operation performed for the first time after the start of the operation illustrated in FIG. 6, but an operation performed again after the operation illustrated in FIG. 6 has already been performed. In the case where, at the time when step S1 is performed again, there is already a result of detection of an object by the object detector 14, the detection range determination unit 15 may determine the object detection range based on the position of the detected object.

After the object detection range is determined in step S1, the parameter setting unit 16 sets various parameters in the electronic device 1 to perform object detection in the determined object detection range (step S2). For example, in step S2, the parameter setting unit 16 sets the parameters so that one of the object detection ranges (1) to (4) illustrated in FIG. 4 will be clipped as the object detection range to perform object detection. Parameters set to clip each object detection range and perform object detection may be, for example, stored in the memory 40. In this case, the parameter setting unit 16 may read the parameters from the memory 40 and set the parameters in step S2. In step S2, the parameter setting unit 16 may set, for example, the parameters for the object detector 14.

In step S2, the parameter setting unit 16 may set various parameters so as to form a beam of transmission waves in the direction of the determined object detection range. For example, in step S2, the parameter setting unit 16 sets the parameters so as to aim the beam of transmission waves at the object detection range determined in step S1. Parameters set to aim the beam of transmission waves at each object detection range may be, for example, stored in the memory 40. In this case, the parameter setting unit 16 may read the parameters from the memory 40 and set the parameters in step S2. In step S2, the parameter setting unit 16 may set, for example, the parameters for the phase controller 23 (transmission controller) or the transmitter 20.

After the parameters are set in step S2, the controller 10 performs control to transmit the transmission waves T from the transmission antenna 25 (step S3). In the case of performing beamforming of the transmission waves T, in step S3, the phase controller 23 (transmission controller) may control the phase of the transmission waves T transmitted from each of the plurality of transmission antennas 25 so that the transmission waves T transmitted from the plurality of transmission antennas 25 will form a beam in a predetermined direction. The phase controller 23 (transmission controller) may also perform control to aim the beam of the transmission waves T in the direction of the object detection range determined in step S1 so as to cover, for example, at least part of the object detection range.

After the transmission waves T are transmitted in step S3, the controller 10 performs control to receive the reflected waves R by the reception antenna 31 (step S4).

After the reflected waves R are received in step S4, the controller 10 detects an object present around the mobile body 100 (step S5). In step S5, the object detector 14 in the controller 10 may perform object detection in the object detection range determined in step S1 (object detection range cutout). In step S5, the object detector 14 in the controller 10 may detect an object based on an estimation result of at least one of the distance FFT processor 11, the speed FFT processor 12, and the arrival angle estimation unit 13.

Since the object detection in step S5 can be performed using a known millimeter wave radar technique according to any of various algorithms, more detailed description is omitted. After step S5 in FIG. 6, the controller 10 may perform step S1 again. In this case, in step S1, an object detection range may be determined based on the result of object detection in step S5. Thus, in the electronic device 1 according to the embodiment, the controller 10 may detect the object reflecting the transmission waves T based on the transmission signal transmitted as the transmission waves T and the reception signal received as the reflected waves R.

While some embodiments and examples of the present disclosure have been described above by way of drawings, various changes and modifications may be easily made by those of ordinary skill in the art based on the present disclosure. Such changes and modifications are therefore included in the scope of the present disclosure. For example, the functions included in the functional parts, etc. may be rearranged without logical inconsistency, and a plurality of functional parts, etc. may be combined into one functional part, etc. and a functional part, etc. may be divided into a plurality of functional parts, etc. Moreover, each of the disclosed embodiments is not limited to the strict implementation of the embodiment, and features may be combined or partially omitted as appropriate. That is, various changes and modifications may be made to the presently disclosed techniques by those of ordinary skill in the art based on the present disclosure. Such changes and modifications are therefore included in the scope of the present disclosure. For example, functional parts, means, steps, etc. in each embodiment may be added to another embodiment without logical inconsistency, or replace functional parts, means, steps, etc. in another embodiment. In each embodiment, a plurality of functional parts, means, steps, etc. may be combined into one functional part, means, step, etc., and a functional part, means, step, etc. may be divided into a plurality of each functional parts, means, steps, etc. Moreover, each of the disclosed embodiments is not limited to the strict implementation of the embodiment, and features may be combined or partially omitted as appropriate.

For example, the foregoing embodiment describes the case where the object detection range is selectively switched by one sensor 5. However, in an embodiment, object detection may be performed in a determined object detection range by a plurality of sensors 5. Moreover, in an embodiment, beamforming may be directed to the determined object detection range by the plurality of sensors 5.

The foregoing embodiment is not limited to implementation as the electronic device 1. For example, the foregoing embodiment may be implemented as a control method of a device such as the electronic device 1. For example, the foregoing embodiment may be implemented as a control program of a device such as the electronic device 1.

The electronic device 1 according to the embodiment may include, for example, at least part of only one of the sensor 5 and the controller 10, as a minimum structure. The electronic device 1 according to the embodiment may include at least one of the signal generator 21, the synthesizer 22, the phase controller 23, the amplifier 24, and the transmission antenna 25 illustrated in FIG. 2 as appropriate, in addition to the controller 10. The electronic device 1 according to the embodiment may include at least one of the reception antenna 31, the LNA 32, the mixer 33, the IF unit 34, and the AD converter 35 as appropriate, instead of or together with the foregoing functional parts. Further, the electronic device 1 according to the embodiment may include the memory 40. The electronic device 1 according to the embodiment can thus have any of various structures. In the case where the electronic device 1 according to the embodiment is mounted in the mobile body 100, for example, at least one of the foregoing functional parts may be installed in an appropriate location such as the inside of the mobile body 100. In an embodiment, for example, at least one of the transmission antenna 25 and the reception antenna 31 may be installed on the outside of the mobile body 100.

REFERENCE SIGNS LIST 1 electronic device
5 sensor
10 controller
11 distance FFT processor
12 speed FFT processor
13 arrival angle estimation unit
14 object detector
15 detection range determination unit
16 parameter setting unit
20 transmitter
21 signal generator
22 synthesizer
23 phase controller
24 amplifier
25 transmission antenna
30 receiver
31 reception antenna
32 LNA
33 mixer
34 IF unit
35 AD converter
40 memory
50 ECU
100 mobile body
200 object

The invention claimed is:

1. An electronic device comprising:
a transmission antenna configured to transmit transmission waves;
a reception antenna configured to receive reflected waves resulting from reflection of the transmission waves; and
a controller configured to detect an object reflecting the transmission waves, based on a transmission signal transmitted as the transmission waves and a reception signal received as the reflected waves, wherein the controller is configured to make a range of detection of the object by the transmission signal and the reception signal, variable such that the range of detection is changed in response to an instruction for a vehicle to perform a predetermined operation.

2. The electronic device according to claim 1, wherein the controller is configured to make the range of the detection of the object switchable between a plurality of ranges.

3. The electronic device according to claim 1, wherein the controller is configured to make the range of the detection of the object variable, depending on a purpose of detecting the object.

4. The electronic device according to claim 1, wherein the controller is configured to determine the range of the detection of the object, based on an object detection result.

5. The electronic device according to claim 1, wherein the transmission antenna includes a plurality of transmission antennas, the electronic device comprises a transmission controller configured to perform control so that transmission waves transmitted from the plurality of transmission antennas will form a beam in a predetermined direction, and the transmission controller is configured to form the beam in a direction of the range of the detection of the object.

6. The electronic device according to claim 5, wherein the transmission controller is configured to form the beam in a direction that covers at least part of the range of the detection of the object.

7. The electronic device according to claim 5, wherein the transmission controller is configured to control a phase of transmission waves transmitted from at least one of the plurality of transmission antennas so that the transmission waves transmitted from the plurality of transmission antennas will be in phase with each other in a predetermined direction.

8. The electronic device according to claim 1, wherein the controller is configured to make the range of the detection of the object variable, based on at least one of a selection by a driver, a handling state, a gear state, a parking assistance state, a free space detection state, a cross traffic alert state, and a blind spot detection state.

9. A control method of an electronic device, comprising:
transmitting transmission waves from a transmission antenna;
receiving reflected waves resulting from reflection of the transmission waves, by a reception antenna;
detecting an object reflecting the transmission waves, based on a transmission signal transmitted as the transmission waves and a reception signal received as the reflected waves; and
making a range of detection of the object by the transmission signal and the reception signal, variable such that the range of detection is changed in response to an instruction for a vehicle to perform a predetermined operation.

10. A non-transitory computer-readable recording medium storing computer program instructions, which when executed by an electronic device, cause a computer to:
transmit transmission waves from a transmission antenna;
receiving reflected waves resulting from reflection of the transmission waves, by a reception antenna;
detect an object reflecting the transmission waves, based on a transmission signal transmitted as the transmission waves and a reception signal received as the reflected waves; and
make a range of detection of the object by the transmission signal and the reception signal, variable such that the range of detection is changed in response to an instruction for a vehicle to perform a predetermined operation.

* * * * *